(12) United States Patent
Maibach et al.

(10) Patent No.: US 10,740,740 B1
(45) Date of Patent: Aug. 11, 2020

(54) MONITORING AND RECOVERY FOR A USB INTERFACE

(71) Applicant: Square, Inc., San Francisco, CA (US)

(72) Inventors: Matthew H. Maibach, San Francisco, CA (US); Benjamin Ridder, San Francisco, CA (US); Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 831 days.

(21) Appl. No.: 15/197,717

(22) Filed: Jun. 29, 2016

(51) Int. Cl.
*G06K 7/00* (2006.01)
*G06Q 20/20* (2012.01)
*G06Q 20/34* (2012.01)
*G06Q 20/40* (2012.01)

(52) U.S. Cl.
CPC ......... *G06Q 20/204* (2013.01); *G06K 7/0004* (2013.01); *G06Q 20/341* (2013.01); *G06Q 20/4014* (2013.01)

(58) Field of Classification Search
CPC .................... G06Q 20/204; G06K 7/0004
See application file for complete search history.

(56) References Cited

U.S. PATENT DOCUMENTS

| | | | | |
|---|---|---|---|---|
| 5,784,581 | A * | 7/1998 | Hannah | G06F 13/4291 710/110 |
| 7,108,560 | B1 * | 9/2006 | Chou | G06K 19/07732 439/660 |
| 9,710,037 | B1 | 7/2017 | Wade et al. | |
| 2005/0189908 | A1 | 9/2005 | Guthrie et al. | |
| 2008/0059661 | A1 * | 3/2008 | Akahane | G06F 13/4081 710/18 |
| 2008/0162974 | A1 * | 7/2008 | Keys | G06F 13/385 713/400 |
| 2008/0265838 | A1 | 10/2008 | Garg et al. | |
| 2008/0316779 | A1 | 12/2008 | Jayaraman et al. | |
| 2010/0169534 | A1 | 7/2010 | Saarinen et al. | |
| 2018/0005207 | A1 | 1/2018 | Wade et al. | |

FOREIGN PATENT DOCUMENTS

| | | |
|---|---|---|
| EP | 2 498 167 A1 | 9/2012 |
| WO | 2015/089803 A1 | 6/2015 |
| WO | 2018/005455 A1 | 1/2018 |

OTHER PUBLICATIONS

Non-Final Office Action dated Nov. 9, 2016, for U.S. Appl. No. 15/197,723, of Wade, J., et al., filed Jun. 29, 2016.
Notice of Allowance dated Mar. 20, 2017, for U.S. Appl. No. 15/197,723, of Wade, J., et al., filed Jun. 29, 2016.
International Search Report and Written Opinion for International Application No. PCT/US2017/039447, dated Sep. 21, 2017.
Examination Report, for European Patent Application No. 17737164. 8, dated Jul. 29, 2019.

* cited by examiner

*Primary Examiner* — Suezu Ellis
(74) *Attorney, Agent, or Firm* — Maynard Cooper & Gale, P.C.; Jon E. Holland

(57) ABSTRACT

A first device and a second device enter a USB monitoring mode. The second device transmits monitoring messages on a periodic basis, while the first device has a monitoring timer that it resets each time a monitoring message is received. If a monitoring message is not received before the monitoring timer expires, the first device starts a reconnect timer. After a certain number of failed attempts to receive monitoring messages, the first device takes corrective action to restore USB communications.

31 Claims, 10 Drawing Sheets

MONITORING AND RECOVERY FOR A USB INTERFACE

BACKGROUND

Devices such as payment systems may have multiple components that are connected to each other through physical cables such as USB cables. These components may communicate with each other over the USB cables, and in some cases, may communicate time-critical or sensitive information over the USB cable. In the example of a payment system, a customer and a merchant may share item selections and other information over the USB cable. Payment information such as credit card information may also be transmitted over the cable.

In a number of situations, a payment system that utilizes a USB cable for communications may be located in an area where electromagnetic interference (EMI) is encountered, for example, from motors of devices such as coffee grinders. In such a situation, the EMI may cause fluctuations in the signals that are being transmitted over the USB cable. In some instances, this may result in the corruption of a data signal being transmitted over data lines of the USB cable. Communications may be lost or unintelligible. In some instances, a USB interface of one of the components of the payment system may cease to function properly as a result of the EMI.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
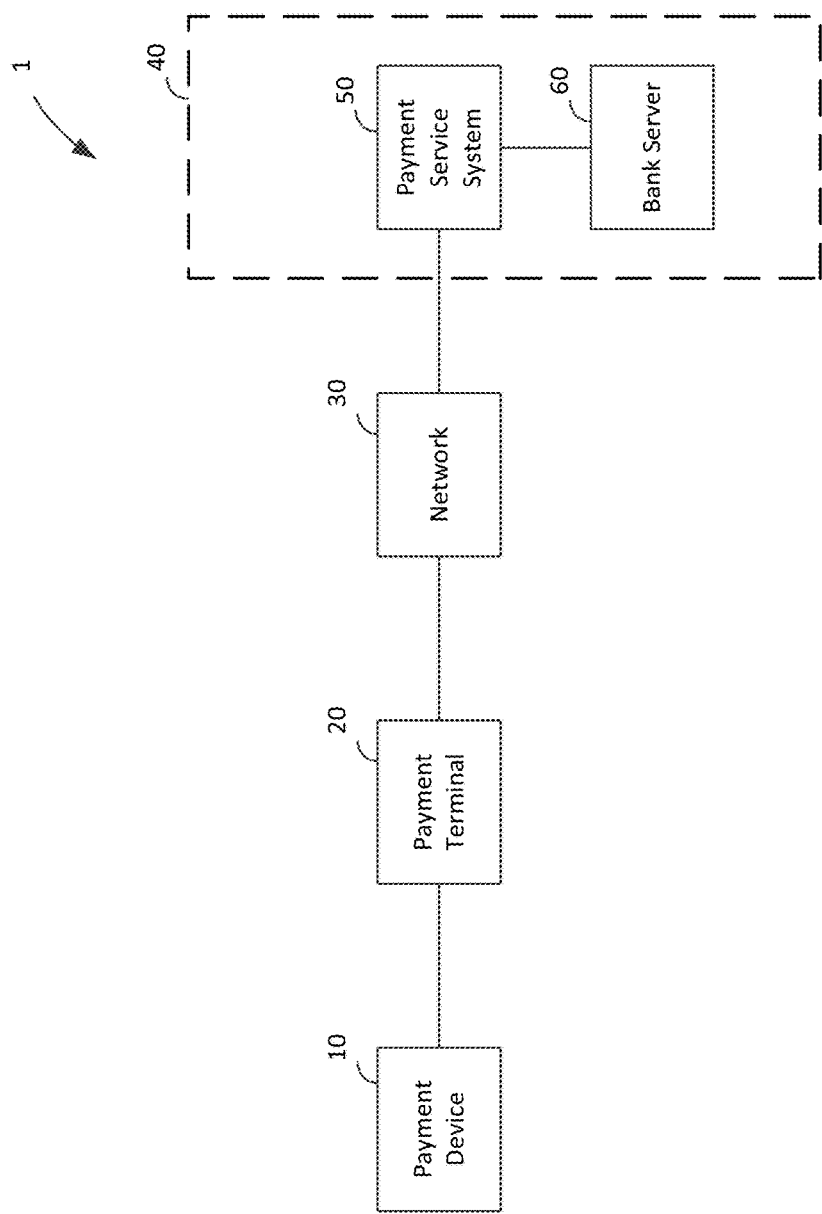
FIG. 1 shows an illustrative block diagram of a payment system in accordance with some embodiments of the present disclosure.

Examples of the present disclosure include a payment system may include a payment terminal and a payment server. The payment terminal may have a payment reader and a merchant device. The payment reader receives payment information from a payment device such as an EMV chip card, a magnetic stripe card, or a NFC payment device. The merchant device has a point-of-sale application that provides a user interface for a merchant, and that communicates with the payment reader and payment server. The payment server processes transactions based on the payment information as well as other information (e.g., payment amount, merchant, location, etc.) received from the merchant device, and communicates a payment result (e.g., approval or denial) back to the merchant device.

The communications between the merchant device and the payment reader may occur over a USB cable. Each of the merchant device and payment reader may execute a monitoring mode. The monitoring mode may begin based on a start trigger that occurs at the merchant device, such as foregrounding of the point-of-sale application or progress in a payment transaction. The merchant device may send a monitoring message (e.g., an initialization message) to the payment reader over the USB interface. Once the payment reader has received this first message, it may also enter the monitoring mode.

Once in the monitoring mode, each of the payment reader and merchant device may run a timer. Each time the merchant device sends a monitoring message, it starts a transmit timer. When the transmit timer expires, the merchant device sends another monitoring message and restarts the transmit timer. The payment reader has a monitoring timer that restarts every time that it receives a monitoring message. As long as the monitoring messages are received by the payment reader prior to the expiration of the monitoring timer, operations continue to proceed in this manner.

If a monitoring message is not received at the payment reader prior to the expiration of the monitoring timer, the payment reader sends a reconnect message back to the merchant device, starts a reconnect timer, and waits for a monitoring message. If a monitoring message is not received before the expiration of the reconnect timer, the payment reader takes a first corrective action that attempts to reestablish USB communications with the merchant device without interrupting payment processing. The payment reader also sends another reconnect message and starts a second monitoring timer. If a monitoring message is not received before the expiration of the second monitoring timer, the payment reader sends another reconnect message and takes a second corrective action such as resetting the payment reader.

Each time that the merchant device receives a reconnect message it sends another monitoring message and increments a failed message counter. Once the failed message counter reaches a threshold (e.g., after receiving three consecutive reconnect messages), the merchant device also takes corrective action. Accordingly, examples of the present disclosure provide an automated mechanism for resolving USB disconnect failures between a payment reader and merchant terminal attributed to EMI and noise from nearby electronic devices.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an example embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
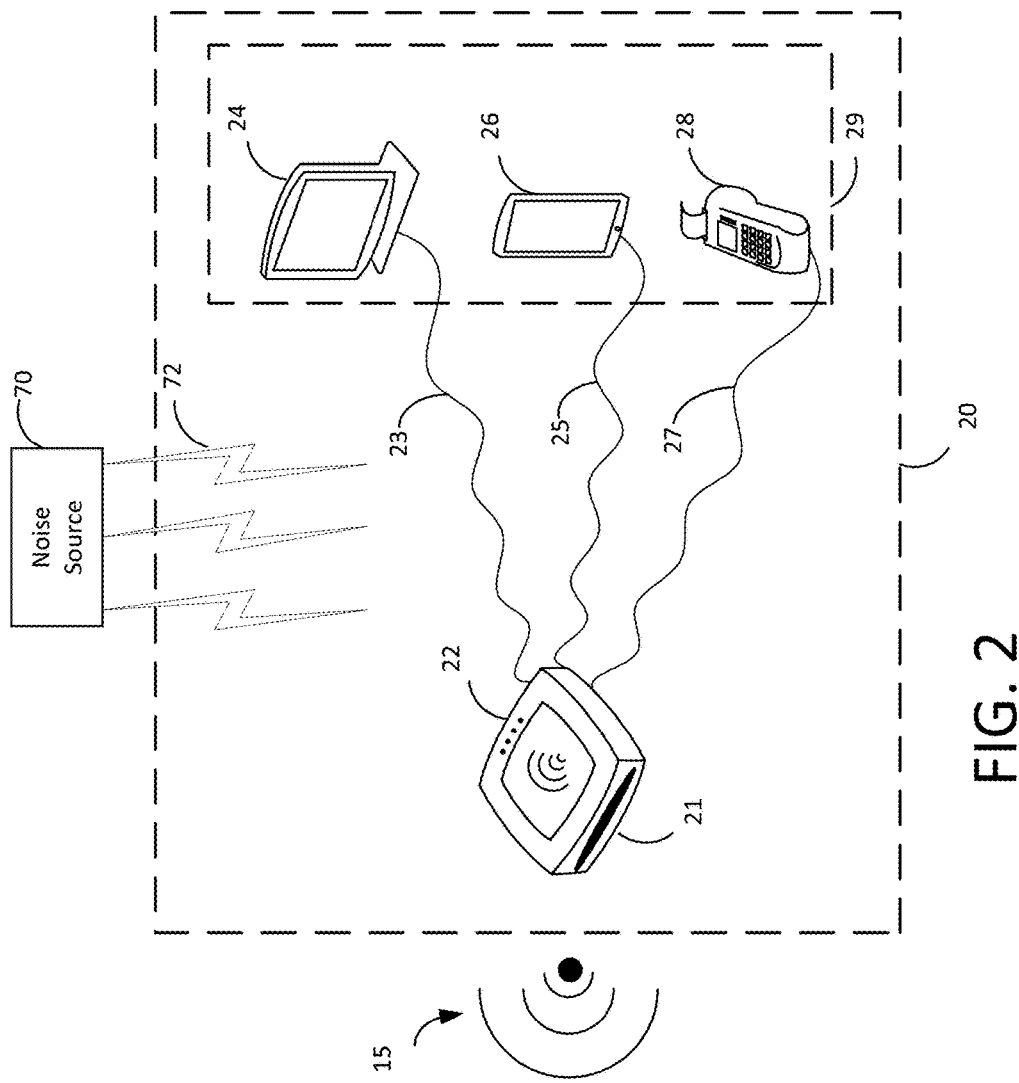
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to the entire payment terminal 20 or any suitable component of the payment terminal, such as payment reader 22 or merchant device 29. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) and/or wireless (e.g., Wi-Fi, Bluetooth, NFC, or ZigBee) connection, in one embodiment payment reader 22 may communicate with the merchant device 29 via a USB connection. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

In many merchant environments the payment terminal 20 may be in proximity to a variety of other equipment that may cause electromagnetic interference (EMI), such as RF electronic devices and industrial or power electronic equipment in the merchant environment that runs a motor. For example, coffee shops may operate coffee grinders, restaurants may operate blenders, and automotive shops may have a variety of equipment that requires a running motor. Such devices may be referred to as noise sources 70, and the EMI emitted from these devices may be referred to as noise 72. In some instances, noise 72 may become coupled to the USB cable 23/25/27. This noise 72 may be strong enough to corrupt a data signal that is being transmitted over the USB cable. This may cause data to be lost, and in some instances, may create problems with the hardware and software of the payment reader 22 or merchant device 29. For example, data buffers or a USB stack of a USB interface may become corrupted. Noise 72 may be strong enough that it may temporarily disable a USB interface of the payment reader 22 or merchant device 29.

Figure 3:
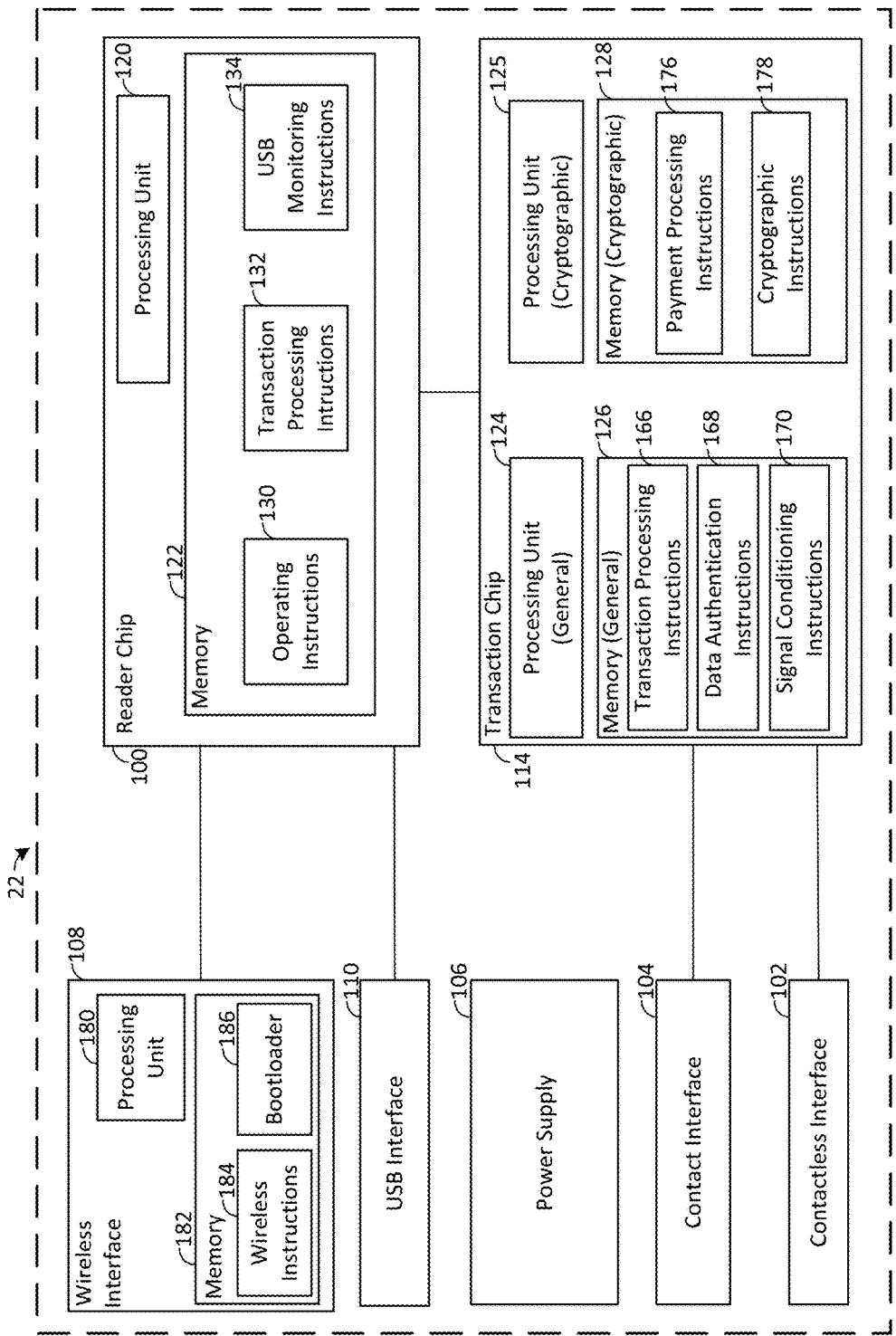
FIG. 3 depicts an illustrative block diagram of a payment reader in accordance with some embodiments of the present disclosure.

FIG. 3 depicts a block diagram of an example payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a terminal chip (e.g., in a payment terminal 20 utilizing a payment reader), a reader chip 100, a plurality of payment interfaces (e.g., a contactless interface 102 and a contact interface 104), a power supply 106, a wireless communication interface 108, a USB interface 110, and a transaction chip 114. Payment reader 22 may also include a processing unit 120 (e.g., a terminal/reader processing unit) and memory 122 in reader chip 100, and general processing unit 124, cryptographic processing unit 125, general memory 126 and cryptographic memory 128 in transaction chip 114. Although in one embodiment the processing units and memories will be described as packaged in a reader chip 100 and transaction chip 114 respectively, and configured in a particular manner, it will be understood that processing unit 120, general processing unit 124, cryptographic processing unit 125, memory 122, general memory 126, and cryptographic memory 128 may be configured in any suitable manner to perform the functionality of the payment reader 22 as is described herein. It will also be understood that the functionality of reader chip 100 and transaction chip 114 may be embodied in a single chip or a plurality of chips, each including any suitable combination of processing units and memory to collectively perform the functionalities of reader chip 100 and transaction chip 114 as described herein.

In some embodiments, reader chip 100 may be a suitable chip, such as a K21 chip supplied by Freescale Semiconductor, Inc. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an example embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with USB interface 110, circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 114 may include one or more processors having processing capability necessary to perform the processing functions described herein, including but not limited to hardware logic, computer readable instructions running on a processor, or any suitable combination thereof. In an example embodiment, transaction chip 114 may perform functionality relating to processing of payment transactions, interfacing with payment devices, cryptography, and other payment-specific functionality. In some embodiments, transaction chip 114 may include a general processing unit 124 for executing instructions associated with general payment functionality and a cryptographic processing unit 125 for handling cryptographic processing operations. Each of general processing unit 124 and cryptographic processing unit 125 may have dedicated memory associated therewith (i.e., general memory 126 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 124 and cryptographic processing unit 125 of transaction chip 114 may communicate with reader chip 100 (e.g., processing unit 120), for example, using any suitable internal bus and communication technique. In this manner, reader chip 100 and transaction chip 114 can collectively process transactions and communicate information regarding processed transactions (e.g., with merchant device 29).

Transaction chip 114 may also include circuitry for interfacing with a contact interface 104 (e.g., power and communication circuitry for directly interfacing with an EMV chip of a chip card 14 that is inserted in slot 21). In some embodiments, transaction chip 114 may also include analog front end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

In some embodiments, general processing unit 124 may include any suitable processor for performing the payment processing functionality of payment reader 22 described herein. In some embodiments, general memory 126 may be any suitable memory as described herein, and may include a plurality of sets of instructions for performing general transaction processing operations of payment reader 22, such as transaction processing instructions 166, data authentication instructions 168, and signal conditioning instructions 170.

Transaction processing instructions 166 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Data authentication instructions 168 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific).

Signal conditioning instructions 170 may include instructions for conditioning signals received from a payment device 10 via the contactless interface 102 (e.g., from a NFC payment device 10). Although in some embodiments, signal conditioning instructions 170 may include instructions for manipulating signals received via contactless interface 102, signal conditioning instructions 170 may include instructions for conditioning signals, including signals that are initially processed by signal conditioning hardware (not depicted in FIG. 3).

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Power supply 106 may include one or more power supplies such as a physical connection to AC power or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an example embodiment, wireless communication interface 108 may be implemented as a Texas Instruments CC2640 device, which may include a processing unit (not depicted) and memory (not depicted).

USB interface 110 may include hardware and software for engaging in communications (e.g., with a merchant device 29) over a USB cable (e.g., USB cable 23/25/27). The USB interface 110 may include a connector that connects to the lines of the USB cable, such as a power line, ground line, data lines, and an ID line. The USB interface may include signal conditioning circuitry and buffers to send, receive, and process communications over the data line. Circuitry may couple one or more other components to the power, ground, or ID lines. A USB stack may include instructions that are executed (e.g., by processing unit 120, based on operating instructions 130) in order to operate USB interface 110. As described herein, noise 72 may cause unexpected signals to be provided to the USB interface. This may result in changes to the data that is sent or received over the data lines and also modify voltages on other lines. Incorrect data or false messages may not only result in lost or incorrect communications, but may also cause problems with buffers or the USB stack, which may enter abnormal states or conditions while attempting to process aberrant data. Some noise 72 may temporarily cause abnormal conditions on hardware of the USB interface 110 or other hardware of the payment reader, such that the USB interface 110 no longer functions properly or fails to function at all.

Memory 122 of reader chip 100 may include a plurality of sets of instructions for controlling operations of payment reader 22, such as operating instructions 130, transaction processing instructions 132, and USB monitoring instructions 134.

Operating instructions 130 may include instructions for controlling general operations of the payment reader 22, such as internal communications, power management, processing of messages, system monitoring, sleep modes, user interface response and control, operation of the wireless interface 108, operation of the transaction chip 114, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via USB interface 110). The operating instructions 130 facilitate processing of the payment, for example, by acquiring payment information via the contactless interface 102 or contact interface 104, by invoking the transaction chip 114 to process that payment information, and by generating responsive messages that are transmitted to the point-of-sale application of the merchant device via wireless communication interface 108 and USB interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100 and transaction chip 114) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip 114 to perform most transaction processing operations.

USB monitoring instructions 134 may include instructions for monitoring the USB interface 110 for communication errors and taking corrective action when necessary. Although the USB interface may be monitored in a variety of manners, in an embodiment, the payment reader 22 may execute a monitoring mode with the merchant device 29. During the monitoring mode the merchant device 29 and payment reader 22 may exchange messages, for example, at regular intervals based on timers. Based on whether or not these messages are received, the monitoring mode may take corrective action at one or both of the payment reader 22 and merchant device 29. Although certain aspects of the monitoring mode will be discussed herein as being performed by the payment reader 22 or merchant device 29, respectively, it will be understood that any such aspects may be performed by the other device. Moreover, while the monitoring mode described herein is generally described as a "one-way" protocol—with only one device (e.g., the merchant device) sending monitoring messages—in other embodiments the monitoring mode may be a "two-way" protocol in which both devices send monitoring messages. While in certain embodiments described herein response messages are not sent in response to each monitoring message, in other embodiments a response message could be required and the failure to receive a response message could be a basis for taking corrective action.

Figure 7:
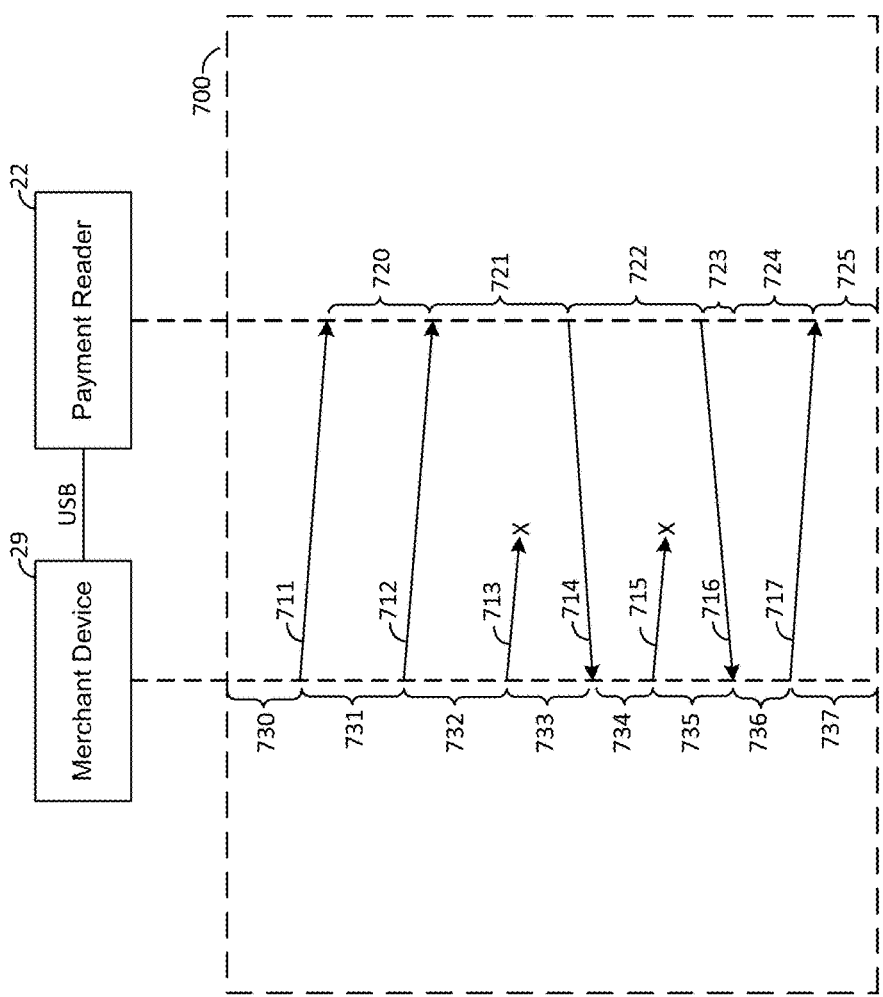
FIG. 7 depicts an example ladder diagram depicting USB monitoring communications and operations in a first corrective action mode in accordance with some embodiments of the present disclosure.
Figure 8:
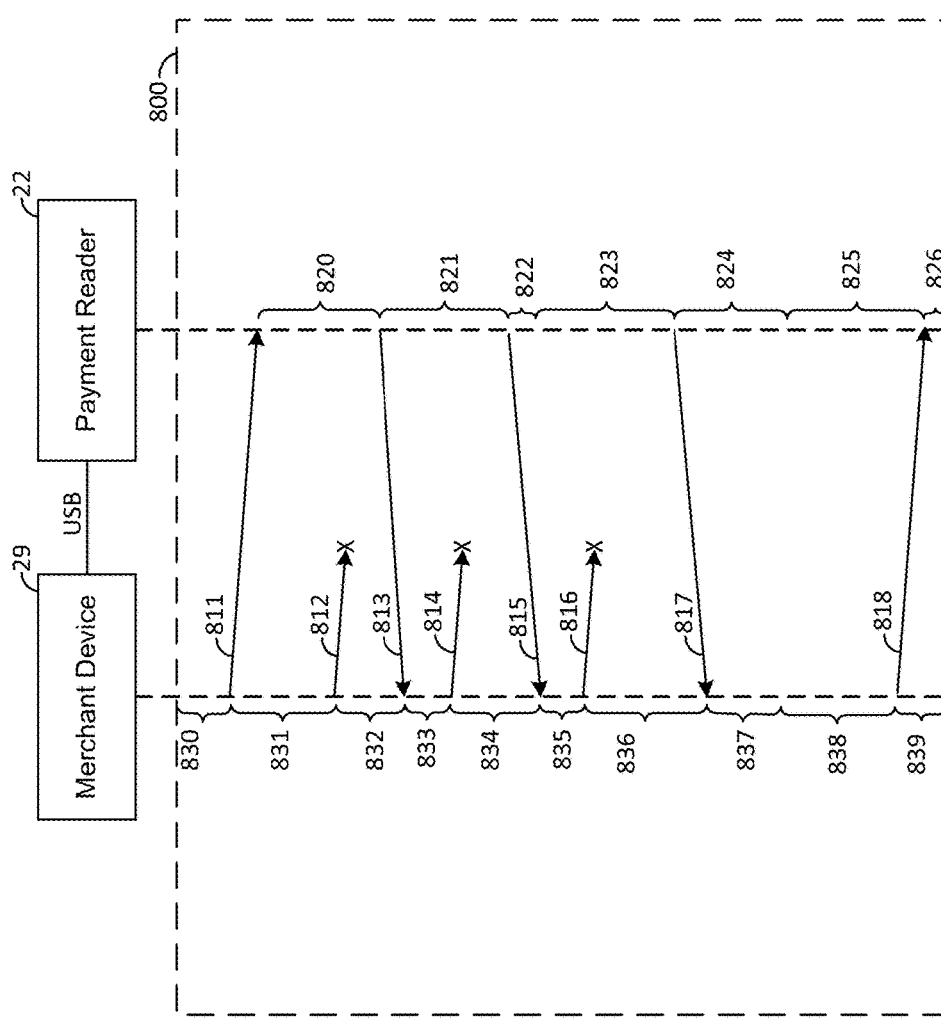
FIG. 8 depicts an example ladder diagram depicting USB monitoring communications and operations in a second corrective action mode in accordance with some embodiments of the present disclosure.
Figure 9:
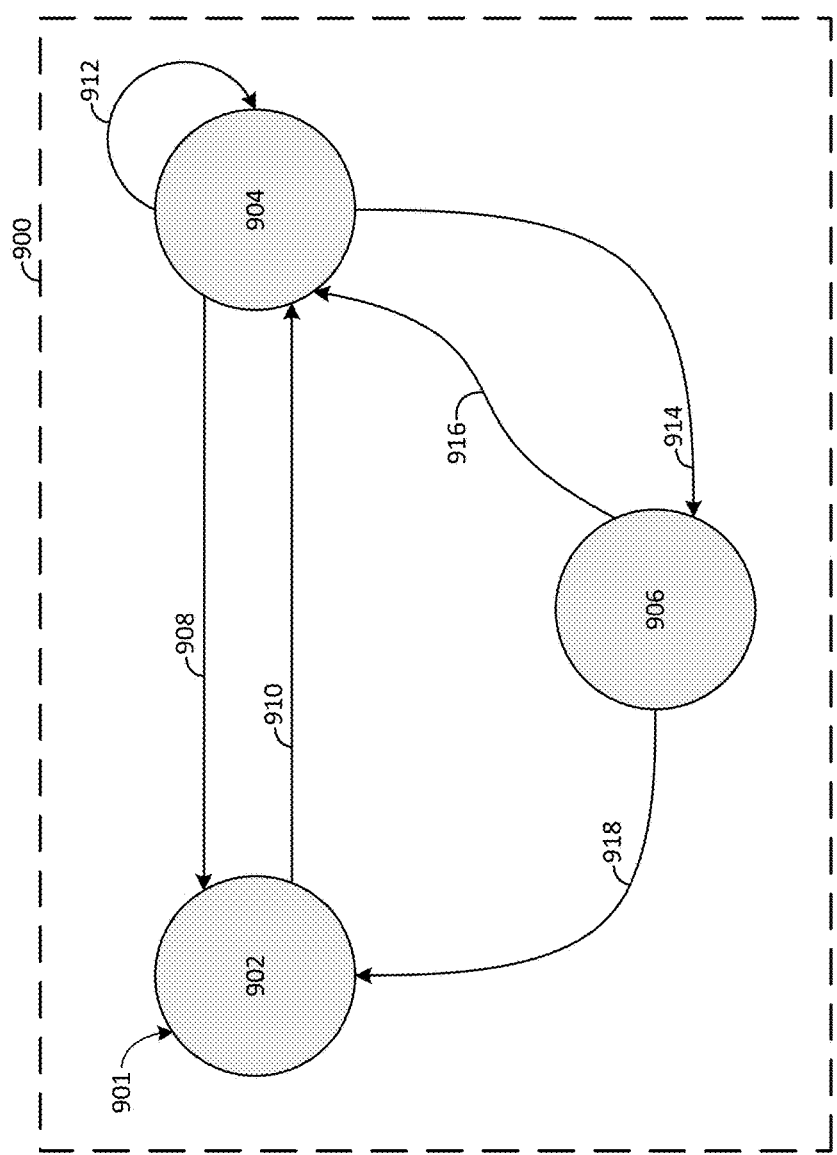
FIG. 9 depicts an example state diagram for a payment reader in accordance with some embodiments of the present disclosure.

USB monitoring instructions 134 may include instructions for performing the operations of the monitoring mode, e.g., as depicted and described in the ladder diagrams of FIGS. 5-8 and the state diagram of FIG. 9. In an embodiment, a monitoring timer may be established for the payment reader 22. If the monitoring timer expires (e.g., by counting down to zero from an initial monitoring timer value, or counting for more than a threshold amount of time) prior to receiving a monitoring message, it may be determined that a messaging error has occurred. If the monitoring message is received prior to the expiration of the monitoring timer, the monitoring timer may be reset and the payment reader 22 may wait for the next monitoring message. The USB monitoring instructions 134 may also establish a reconnect counter. The reconnect counter may be incremented each time that the monitoring timer expires, and reset each time a monitoring message is received. The USB monitoring instructions 134 may also establish any suitable number of reconnect counters, such as first and second reconnect counters. If one of the reconnect timers expires (e.g., by counting down to zero from an initial timer value, or counting for more than a threshold amount of time) prior to receiving a monitoring message, it may be determined that first reconnect error or a second reconnect error has occurred. The USB monitoring instructions 134 may also provide instructions for providing a reconnect message under certain conditions, e.g., each time that the monitoring timer expires.

The USB monitoring instructions 134 may also include a plurality of possible corrective actions that may be taken in response to a failure to receive a monitoring message. Some corrective actions may attempt to remedy the problem with USB communications without stopping payment processing or otherwise interrupting normal operation of the payment readers, e.g., by resetting USB interface 110, resetting a USB stack running on processing unit 120, or discharging the data lines of the USB interface. Other corrective actions may be a more severe corrective action, e.g., that may interrupt payment processing or other functionality of the payment reader, e.g., by stopping the processing of the payment reader and cycling power to the components thereof. In some embodiments, the USB monitoring instructions may provide a hierarchy of corrective actions, such that different corrective actions are performed under different circumstances.

Figure 4:
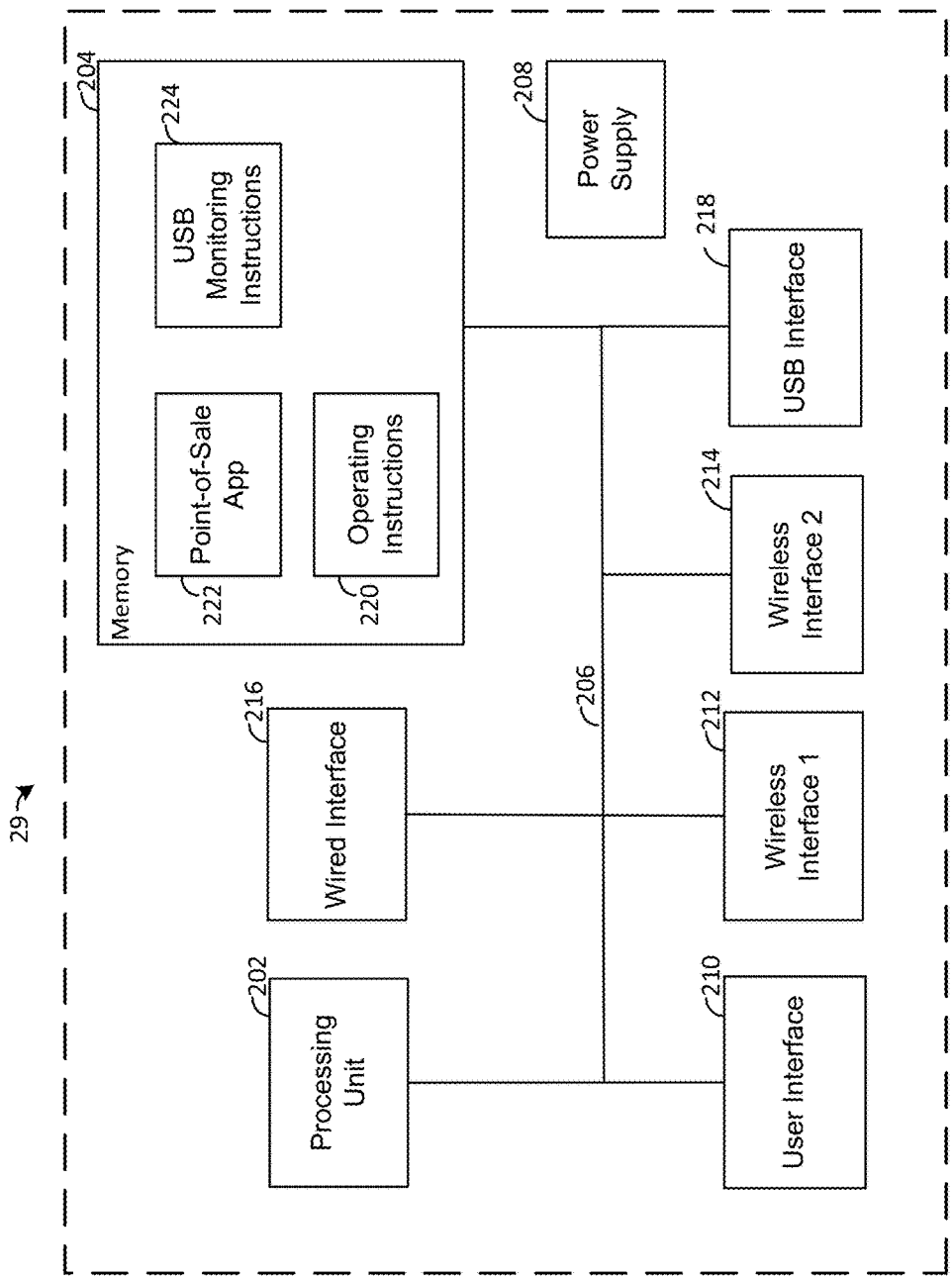
FIG. 4 depicts an illustrative block diagram of a merchant device in accordance with some embodiments of the present disclosure.

FIG. 4 depicts an example merchant device 29 in accordance with some embodiments of the present disclosure. Although merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, a wired interface 216, and a USB interface 218.

In one embodiment, the merchant device 29 includes a processing unit 202 and memory 204 that are configured to control and perform the necessary operations of the merchant device 29. In one embodiment, the processing unit 202 of may be a general-purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and USB monitoring instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An example user interface 210 may include hardware and software for any suitable user interface, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that communicates with payment reader 22 (e.g., Bluetooth low energy interface) while a second wireless communication interface 214 may be a wireless communication interface (e.g., WiFi) that communicates with a payment service system 50 of payment server 40 (e.g., via the internet).

Merchant device may also include a wired interface 216, which may include any suitable interface for wired communication with other devices (e.g., a payment reader 22) or a communication network (e.g., to contact a payment server 40), such as USB, Lightning, FireWire, Ethernet, any other suitable wired communication interface, or any combination thereof.

USB interface 218 may include hardware and software for engaging in communications (e.g., with a payment reader 22) over a USB cable (e.g., USB cable 23/25/27). The USB interface 218 may include a connector that connects to the lines of the USB cable, such as a power line, ground line, data lines, and an ID line. The USB interface may include signal conditioning circuitry and buffers to send, receive, and process communications over the data line. Circuitry may couple one or more other components to the power, ground, or ID lines. A USB stack may include instructions that are executed (e.g., by processing unit 202, based on operating instructions 220) in order to operate USB interface 218. As described herein, noise 72 may cause unexpected signals to be provided to the USB interface. This may result in changes to the data that is sent or received over the data lines and also modify voltages on other lines. Incorrect data or false messages may not only result in lost or incorrect communications, but may also cause problems with buffers or the USB stack, which may enter abnormal states or conditions while attempting to process aberrant data. Some noise 72 may temporarily cause abnormal conditions on hardware of the USB interface 218 or other hardware of the merchant device 29, such that the USB interface 218 no longer functions properly or fails to function at all.

Operating instructions 220 of memory 204 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, and USB monitoring instructions 224. In one embodiment, the operating instructions 220 may include instructions to display information about an operating mode (e.g., low-power mode or transaction processing mode) of a payment reader 22 or other information about payment reader 22 based on USB monitoring instructions 224 and point-of-sale application instructions 222. Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 may include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions 222 may include instructions for providing a rich display of information relating to settings for the monitoring mode, including which operations to perform at which device (e.g., payment reader 22 or merchant device 29), start triggers, stop triggers, monitoring timer values, transmit timer values, types of corrective action, and corrective action hierarchies.

In some embodiments, point-of-sale application 222 may display a variety of graphical elements when a user opens the application. This "foregrounding" may include version information or other details about the point-of-sale application 222. In some embodiments, point-of-sale application 222 may provide a register interface to allow a user to enter a payment amount, select items for purchase, and modify purchase options by providing inputs at the user interface 210. The point-of-sale application 222 may remain in this mode until a user provides an input indicating that the user is ready to provide payment information for processing. In some embodiments, point-of-sale application 222 may prompt a user for selection of a payment method. The user may select a payment method based on an indication at the point-of-sale application 222, or by providing an input at the merchant device 29 or payment reader 22. In some embodiments, a payment method may be selected based on interaction of a payment device 10 with an interface of payment reader 22 (e.g., contact interface 104 or contactless interface 102). In some embodiments, point-of-sale application 222 may include instructions for displaying a customer verification method for obtaining authorization to process a payment transaction on the payment method provided, such as through user input. In some embodiments, the verification method may be a number panel for entry of a unique personal identification number (PIN) or a cardholder's signature. Other methods may be used in other embodiments. In some embodiments, point-of-sale application 222 may provide an indicator that the transaction is complete following approval of the payment transaction at the merchant device 29, such as from a transaction processing server or based on a self-approval provided at the merchant device 29. Point-of-sale application may display the transaction complete indicator at the user interface 210, indicating that the transaction has concluded.

USB monitoring instructions 224 may include instructions for monitoring the USB interface 218 for communication errors and taking corrective action when necessary. Although certain instructions will be described with respect to the merchant device 29, it will be understood that USB monitoring instructions 224 of merchant device 29 may include any of the instructions described with respect to USB instructions 134 of payment reader 22. Similarly, USB instructions 134 of payment reader 22 may include any of the instructions described with respect to USB monitoring instructions 224 of merchant device 29.

Figure 10:
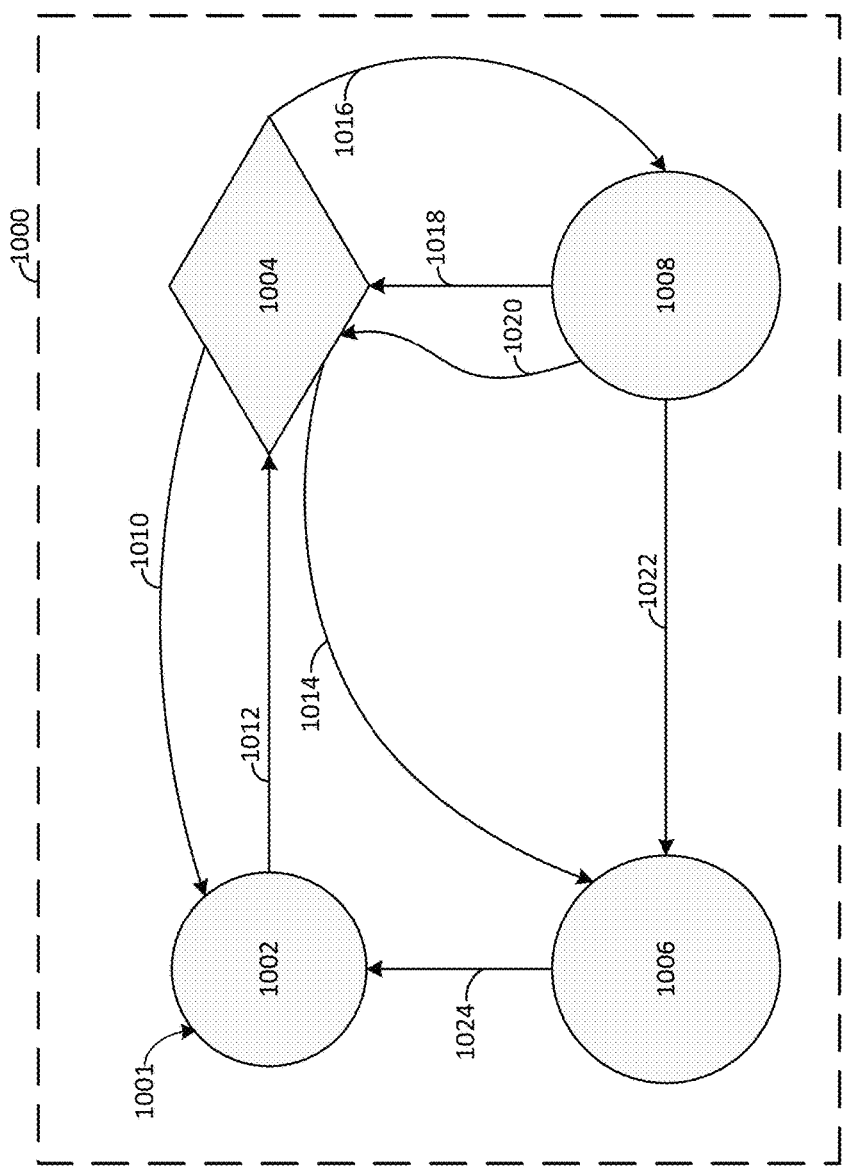
FIG. 10 depicts an example state diagram for merchant device 29 in accordance with some embodiments of the present disclosure.

USB monitoring instructions 224 may include instructions for performing the operations of the monitoring mode, e.g., as depicted and described in the ladder diagrams of FIGS. 5-8 and the state diagram of FIG. 10. In an embodiment, the USB monitoring instructions 224 may include instructions for a start trigger and a stop trigger. A start trigger may determine when to invoke the monitoring mode, and may be based on events such as the powering up of the merchant device 29, opening (e.g., foregrounding) of the point-of-sale application, a merchant starting a transaction, or a certain level of progress in the payment action (e.g., selecting item, finalizing items, etc.). A stop trigger may determine when to exit the monitoring mode, and may be based on events such as the closing (e.g., backgrounding) of the point-of-sale application, a merchant ending a transaction, an elapsed time since the previous transaction, or a frequency of transactions falling below a threshold. In some embodiments, the start and stop triggers may be automatically configurable, e.g., based on known times and events when it is determined that USB connections are regularly lost (e.g., certain transactions or times of day).

In an embodiment, a transmit timer may be established for the merchant device 29. Each time that the transmit timer expires (e.g., by counting down to zero from an initial transmit timer value, or counting for more than a threshold amount of time), and no other message is received (e.g., no reconnect message is received), a new monitoring message may be transmitted from the merchant device 29 and the transmit timer may be restarted. The USB monitoring instructions 224 may also establish a failed message counter. The failed message counter may be incremented each time that a reconnect message is received, and may reset each time that the transmit timer expires without receiving a reconnect message.

The USB monitoring instructions 224 may also include a plurality of possible corrective actions that may be taken in response to a failure to receive a monitoring message. Some corrective actions may attempt to remedy the problem with USB communications without stopping payment processing or otherwise interrupting normal operation of the payment readers, e.g., by resetting USB interface 218, resetting a USB stack running on processing unit 202, or discharging the data lines of the USB interface. Other corrective actions may be a more severe corrective action, e.g., that may interrupt payment processing or other functionality of the payment reader, e.g., stopping the processing of the payment reader and cycling power to the components thereof. In some embodiments, the USB monitoring instructions 224 may provide a hierarchy of corrective actions, such that different corrective actions are performed under different circumstances.

In view of the structures and devices described supra, methods that can be implemented in accordance with the disclosed subject matter will be better appreciated with reference to the ladder diagrams of FIGS. 5-8 and the state diagrams of FIGS. 9-10. While, for purposes of simplicity of explanation, the diagrams are shown and described as a series of actions or states, it is to be understood and appreciated that such illustrations or corresponding descriptions are not limited by the order of the actions or states, as some actions or states may occur in different orders and/or concurrently with other actions or states from what is depicted and described herein. Moreover, not all illustrated actions or states may be required to implement the methods described hereinafter. Although the communications and operations depicted and described with respect to FIGS. 5-10 are performed between a merchant device 29 and a payment reader 22, and via a USB interface, it will be understood that the methodology can be performed by any suitable devices connected via a variety of user interfaces, e.g., in order to monitor the operations of a communication link and communication circuitry, and to take appropriate remedial action as required.

Figure 5:
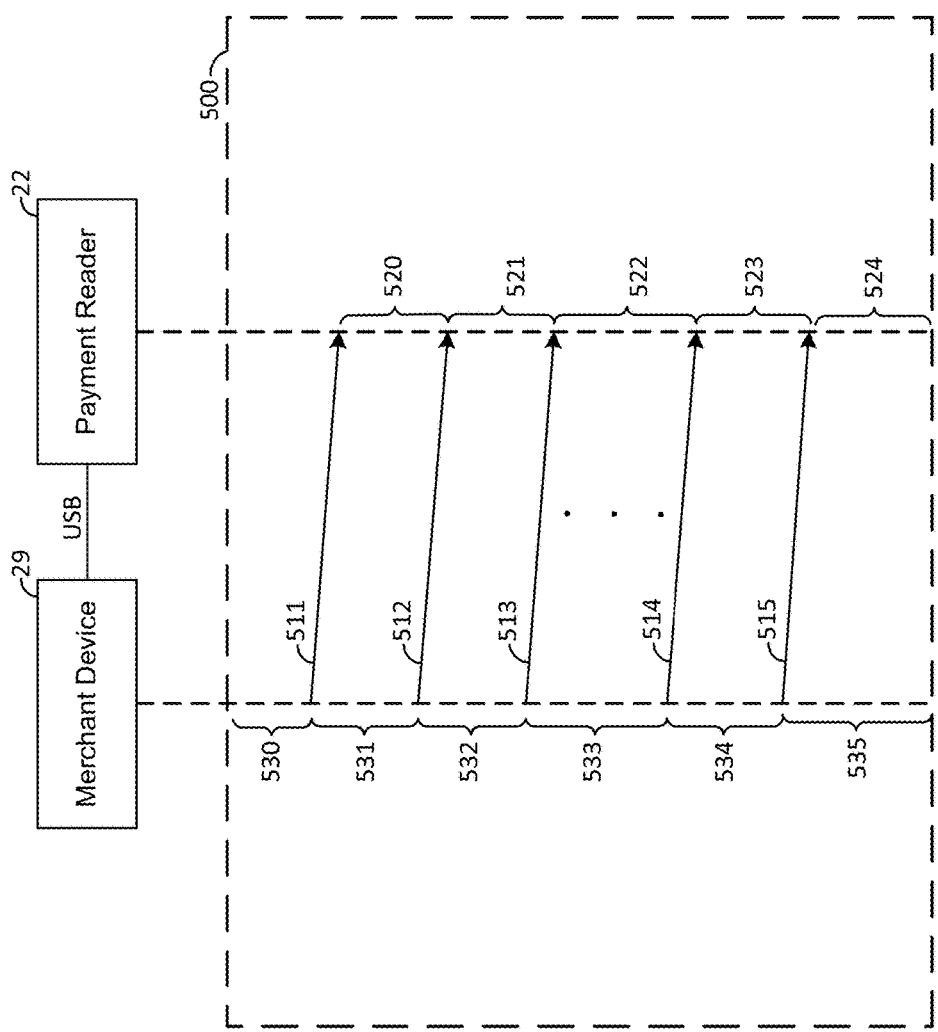
FIG. 5 depicts an example ladder diagram depicting USB monitoring communications and operations in a normal operating mode in accordance with some embodiments of the present disclosure.

FIG. 5 depicts an example ladder diagram depicting USB monitoring communications and operations in a normal operating mode in accordance with some embodiments of the present disclosure. As depicted in FIG. 5, a merchant device 29 is coupled to a payment reader 22 over a USB cable. The communications depicted in FIG. 5 (i.e., messages 511, 512, 513, 514, and 515) are communicated between merchant device 29 and payment reader 22 via the USB cable. The operations depicted in FIG. 5 are performed by merchant device 29 (e.g., operations 530, 531, 532, 533, 534, and 535 performed by processing unit 202 executing USB monitoring instructions 224, to operate USB interface 218) and payment reader 22 (e.g., operations 520, 521, 522, 523, and 524 performed by processing unit 120 of reader chip 100 executing USB monitoring instructions 134, to operate USB interface 110).

At operation 530, merchant device 29 may initialize monitoring communications with payment reader 22. In an embodiment, a user may interact with a point-of-sale application at user interface 210 (e.g., based on processing unit 202 executing point-of-sale application instructions 222) in a manner that causes the monitoring mode to begin (e.g., based on processing unit 202 executing USB monitoring instructions 224). In an embodiment, USB monitoring instructions 224 may include one or more start triggers for invoking the monitoring mode, such as the powering up of the merchant device 29, opening (e.g., foregrounding) of the point-of-sale application, a merchant starting a transaction, a certain level of progress in the payment action (e.g., selecting item, finalizing items, etc.). In some embodiments, the start triggers may be modifiable by a user or in an automated manner, as described herein.

Once the start triggering event occurs, the processing unit 202 of merchant device 29 may execute the USB monitoring instructions 224 to initialize the USB monitoring mode. As described herein, messages may be generated and transmitted at regular intervals (e.g., periodically) such based on interval settings. In some embodiments, one or more of the messages may include configuration information for the monitoring mode of the payment reader 22, such as settings for thresholds, monitoring timer values, and corrective actions. In some embodiments, such information may be provided in an initialization message. The initialization message may also include message information, such as an identifier for the merchant device 29, an identifier for the payment reader 22, and a transmit time for the message. Once the monitoring mode of the merchant device 29 has been invoked an initialization message 511 may be transmitted to the payment reader 22 over the USB connection via USB interface 218.

Operation 531 may begin once the initialization message is sent. Although the monitoring mode may operate differently in a variety of embodiments, in one embodiment, the merchant device 29 may send monitoring messages to the payment reader 22 (e.g., at a regular interval, such as periodically). Thus, at operation 531, the merchant device 29 may invoke a transmit timer, after the expiration of which another monitoring message may be sent. Also during operation 531 the merchant device 29 may monitor the USB interface 218 for any messages (e.g., monitoring messages, reconnect messages, etc.) sent by payment reader 22.

Operation 520 begins when payment reader 22 receives initialization message 511 over the USB interface 110. The initialization message 511 may be processed by processing unit 120 based on the USB monitoring instructions 134. Based on the received initialization message, the payment reader 22 may initialize the USB monitoring mode (e.g., by processing unit 120 executing USB monitoring instructions 134). In some embodiments, parameters for the USB monitoring mode (e.g., thresholds, monitoring timer values, and corrective actions) may be updated based on the content of the received initialization message. The monitoring timer of the payment reader may then be initialized and payment reader 22 may monitor the USB interface 110 for additional monitoring messages from merchant device 29.

At the expiration of the transmit timer at the merchant device 29, a monitoring message 512 may be sent. In an embodiment, the monitoring message may not include configuration information (e.g., the thresholds, monitoring timer values, and corrective actions sent with the initialization message 511) unless a modification to the monitoring mode of the payment reader is required (e.g., by including a modification indicator in the monitoring message, and providing the configuration information in the same or a subsequent message). The monitoring message may include message information, such as an identifier for the merchant device 29, an identifier for the payment reader 22, and a transmit time for the message. Once the monitoring message 512 is sent, at operation 532, the merchant device 29 may reset the transmit timer and monitor the USB interface 218 for any messages from payment reader 22.

Operation 521 begins when payment reader 22 receives message 512 over the USB interface 110. The monitoring message 512 may be processed by processing unit 120 based on the USB monitoring instructions 134. If as depicted for message 512, the monitoring message is received at payment reader 22 prior to the expiration of the monitoring timer, the monitoring timer may be reset and the payment reader 22 may continue to monitor the USB interface 110 for additional monitoring messages from merchant device 29.

In some embodiments, (not depicted in FIGS. 5-8) the payment reader 22 may also transmit a confirmation message each time an initialization message or monitoring message is received. In this manner, the merchant device 29 could remain aware of the status of the payment reader. Under such an embodiment (not depicted in FIGS. 5-8), payment reader 22 could take different forms of corrective action based on a number of times the monitoring timer expires while merchant device 29 could take corrective action based on the number of times that confirmation messages are not received. Although not depicted in FIGS. 5-8, the determination of whether to take corrective action could be based on factors other than how many consecutive transmission failures occur (e.g., based on a reconnect counter and a failed message counter, as described herein), such as a frequency of failure or factors relating to the merchant device 29 or payment reader 22 (e.g., predicted time until the end of a transaction, transaction frequency, etc.).

Returning to FIG. 5, FIG. 5 depicts a situation in which USB communications are not interrupted as a result of noise 72 from a noise source 70 causing an error at one or both of the payment reader 22 (e.g., USB interface 110 or processing operations of processing unit 120 such as USB stack) or merchant device 29 (e.g., USB interface 218 or processing operations of processing unit 202 such as a USB stack). Merchant device 29 may continue to send monitoring messages (e.g., monitoring messages 513-514) and continue to reset the transmit timer and monitor the USB interface 218 for any messages from payment reader 22 (e.g., at operations 533 and 534). Payment reader may continue to receive monitoring messages (e.g., monitoring messages 513-514) and continue to reset the monitoring timer and monitor the USB interface 110 for any messages from payment reader 29 (e.g., at operations 522 and 523).

During operation 534, the payment reader 22 may determine that the monitoring mode should be stopped. In an embodiment, USB monitoring instructions 224 may include one or more stop triggers for stopping the monitoring mode, such as the closing (e.g., backgrounding) of the point-of-sale application, a merchant ending a transaction, an elapsed time since the previous transaction, or a frequency of transactions falling below a threshold. In some embodiments, the triggers may be modifiable by a user or in an automated manner, as described herein. Once the stop trigger occurs, the merchant device 29 may send a stop message 515 to the payment reader 22. The stop message may include any suitable information such as configuration information, message information, and session summary information (e.g., information about the session such as number of reconnect attempts, number corrective action attempts, elapsed time for session, etc.). After sending the stop message, at operation 535, merchant device 29 may exit the monitoring mode, cease sending monitoring messages, and may wait for another start trigger. Once payment reader 22 receives the stop message, at operation 524, payment reader 22 may exit the monitoring mode and wait for another initialization or monitoring message.

Figure 6:
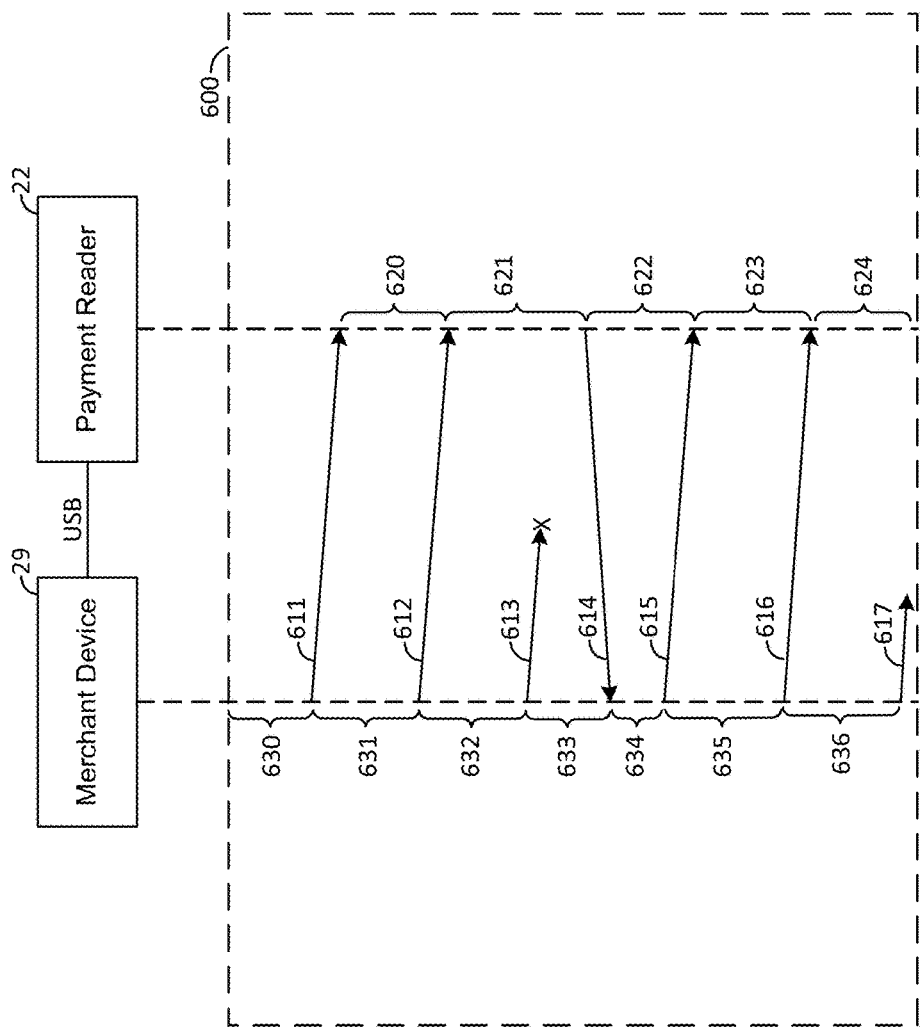
FIG. 6 depicts an example ladder diagram depicting USB monitoring communications and operations in a reconnect mode in accordance with some embodiments of the present disclosure.

FIG. 6 depicts an example ladder diagram depicting USB monitoring communications and operations in a reconnect mode in accordance with some embodiments of the present disclosure. As depicted in FIG. 6, a merchant device 29 is coupled to a payment reader 22 over a USB cable. The communications depicted in FIG. 6 (i.e., messages 611, 612, 613, 614, 615, 616, and 617) are communicated between merchant device 29 and payment reader 22 via the USB cable. The operations depicted in FIG. 6 are performed by merchant device 29 (e.g., operations 630, 631, 632, 633, 634, 635, and 636 performed by processing unit 202 executing USB monitoring instructions 224, to operate USB interface 218) and payment reader 22 (e.g., operations 620, 621, 622, 623, and 624 performed by processing unit 120 of reader chip 100 executing USB monitoring instructions 134, to operate USB interface 110).

Initially, the processing of FIG. 6 may proceed in a similar manner to FIG. 5, with merchant device 29 initiating the monitoring mode in response to a start trigger at operation 630, sending the initialization message 611, and at operation 631 starting the transmit timer and checking for messages from the payment reader 22. At operation 620, payment reader 22 may begin the monitoring mode in response to receiving the initialization message 611 at operation 620, and may start the monitoring timer and wait for additional messages from the merchant device 29. Another monitoring message 612 may be sent at the expiration of the transmit timer, and at operation 632 merchant device 29 may reset the transmit timer and continue monitoring for messages from the payment reader. The payment reader 22 may successfully receive the monitoring message 612 prior to the expiration of the monitoring timer, and at operation 621 may reset the monitoring timer and wait for additional messages from the merchant device 29.

Monitoring message 613 may be transmitted by merchant device 29 at the expiration of the transmit timer in operation 632. However, as depicted in FIG. 6, monitoring message 613 may not be successfully received at payment reader 22 (e.g., as a result of electromagnetic interference such as noise 72 emitted by a noise source interfering with the message). At operation 621, the monitoring timer may expire and the payment reader 22 may initiate a response. In an embodiment, in the first instance of a failure to receive the monitoring message before the expiration of the monitoring timer, the payment reader 22 may enter a reconnect mode in which a reconnect message 614 is sent by payment reader 22. In other embodiments, payment reader could immediately take corrective action, or abstain from sending a reconnect message and simply wait to see if another monitoring message is received within the monitoring time before starting the reconnect timer.

Although the relative timing of the transmit timer and the monitoring timer may be configured in any suitable manner, in an embodiment the transmit timer and monitoring timer may expire in a manner such that the reconnect message 614 would be received prior to the expiration of the transmit timer in operations 633. In an embodiment of a transmit timer that expires at two seconds and a monitoring timer that expires at three seconds, the reconnect message 614 would be sent by payment reader 22 prior to the transit timer expiring.

Once the reconnect message 614 is sent, payment reader 22 (at operation 622) may start a reconnect timer, increment a reconnect counter representing a number of missed monitoring messages, and resume waiting for messages from merchant device 29. Although the reconnect timer may have any suitable value (e.g., defining an interval as necessary to wait for another monitoring message), in some embodiments the reconnect timer may have the same value as the monitoring timer. As depicted in FIG. 6, the reconnect message 614 may be successfully received at merchant device 29. In an embodiment, at operation 634, merchant device 29 may increment a failed message counter and send another monitoring message 615. Although not depicted in FIG. 6, in another embodiment where the reconnect message is not received by merchant device 29, the merchant device 29 would nonetheless send another monitoring message 615 at the expiration of the transmit timer.

After monitoring message 615 is sent, at operation 635, merchant device 29 may reset the transmit timer and resume waiting for messages from payment reader 22. Payment reader 22 may receive the monitoring message 615 prior to the expiration of the reconnect timer, and at operation 623, may start the monitoring timer, reset the reconnect counter, and resume waiting for monitoring messages. At the expiration of the transmit timer in operation 635, merchant device 29 may assume that the monitoring message 615 did not fail because a second reconnect message was not received. A monitoring message 617 may be sent, and processing of monitoring messages may continue normally in operations 636, 624, and with a next monitoring message 617. Processing may then continue as described herein until a stop message is received.

FIG. 7 depicts an example ladder diagram depicting USB monitoring communications and operations in a first corrective action mode in accordance with some embodiments of the present disclosure. As depicted in FIG. 7, a merchant device 29 is coupled to a payment reader 22 over a USB cable. The communications depicted in FIG. 7 (i.e., messages 711, 712, 713, 714, 715, 716, and 717) are communicated between merchant device 29 and payment reader 22 via the USB cable. The operations depicted in FIG. 7 are performed by merchant device 29 (e.g., operations 730, 731, 732, 733, 734, 735, 736, and 737 performed by processing unit 202 executing USB monitoring instructions 224, to operate USB interface 218) and payment reader 22 (e.g., operations 720, 721, 722, 723, 724, and 725 performed by processing unit 120 of reader chip 100 executing USB monitoring instructions 134, to operate USB interface 110).

Initially, the processing of FIG. 7 may proceed in a similar manner to FIGS. 5 and 6, with merchant device 29 initiating the monitoring mode in response to a start trigger at operation 730, sending the initialization message 711, and at operation 731 starting the transmit timer and checking for messages from the payment reader 22. At operation 720, Payment reader 22 may begin the monitoring mode in response to receiving the initialization message 711 at operation 720, and may start the monitoring timer and wait for additional messages from the merchant device 29. Another monitoring message 712 may be sent at the expiration of the transmit timer, and at operation 732 merchant device 29 may reset the transmit timer and continue monitoring for messages from the payment reader. The payment reader 22 may successfully receive the monitoring message 712 prior to the expiration of the monitoring timer, and at operation 721 may reset the monitoring timer and wait for additional messages from the merchant device 29.

Monitoring message 713 may be transmitted by merchant device 29 at the expiration of the transmit timer in operation 732. However, as depicted in FIG. 7, monitoring message 713 may not be successfully received at payment reader 22 (e.g., as a result of electromagnetic interference such as noise 72 emitted by a noise source interfering with the message). At operation 721, the monitoring timer may expire and the payment reader 22 may initiate a response. As with the embodiment of FIG. 6, in the first instance of a failure to receive the monitoring message before the expiration of the monitoring timer, the payment reader 22 may enter a reconnect mode in which a reconnect message 714 is sent by payment reader 22.

Once the reconnect message 714 is sent, payment reader 22 (at operation 722) may start the reconnect timer, increment a reconnect counter representing a number of missed monitoring messages, and resume waiting for messages from merchant device 29. As depicted in FIG. 7, the reconnect message 714 may be successfully received at merchant device 29. In an embodiment, at operation 734, merchant device 29 may increment a failed message counter and send another monitoring message 715. Although not depicted in FIG. 7, in another embodiment where the reconnect message is not received by merchant device 29, the merchant device 29 would nonetheless send another monitoring message 715 at the expiration of the transmit timer.

As depicted in FIG. 7, monitoring message 715 may not be successfully received at payment reader 22. At operation 723, the reconnect timer may expire and the payment reader 22 may initiate a response. In an embodiment, because this is the second consecutive failure to receive the monitoring message (e.g., based on the value of the reconnect counter), the payment reader 22 may enter a first corrective action mode. Although the first corrective action mode may function in any suitable manner, in an embodiment reconnect messages may continue to be sent by the payment reader 22, and a first corrective action may be taken as described herein. In the example embodiments described in FIGS. 5-8, the payment reader may make two attempts to engage in corrective action, with the attempts increasing in severity from the first attempt to the second. However, it will be understood that any suitable number of attempts at corrective action may be made, with the mode of the attempt being repeated or changed based on various protocols.

The payment reader 22 may send a second reconnect message 716 and commence operation 723 to engage in the first corrective action. In the embodiment of FIG. 7, the first corrective action may attempt to remedy the problem with USB communications without stopping payment processing or otherwise interrupting normal operation of the payment readers, e.g., by resetting USB interface 110, resetting a USB stack running on processing unit 120, or discharging the data lines of the USB interface. The reconnect counter may also be incremented. Once the first corrective action is completed, payment reader 22 may start a second the reconnect timer and wait for messages from merchant device 29 at operation 724. Although the second reconnect timer may have any suitable value (e.g., a necessary interval to wait for the execution of the first corrective action), in an embodiment the second reconnect timer may have the same value as the first reconnect timer.

As depicted in FIG. 7, the reconnect message 716 may be successfully received at merchant device 29. In an embodiment, at operation 736, merchant device 29 may increment a failed message counter and send another monitoring message 717. Although not depicted in FIG. 7, in another embodiment where the reconnect message is not received by merchant device 29, the merchant device 29 would nonetheless send another monitoring message 717 at the expiration of the transmit timer.

Although in some embodiments, at operation 737 the merchant device 29 could take a corrective action (e.g., based on the value of the failed message timer), and similar to payment reader, could have multiple levels of corrective actions, in the embodiment of FIG. 7 the merchant device 29 may not take corrective action at operation 737. At operation 737, the merchant device 29 may increment the failed message counter, reset the transmit timer, and again wait for messages from payment reader 22.

If the corrective action is successful, payment reader 22 may receive monitoring message 717. Based on the successfully received monitoring message, payment reader 22 may reset the reconnect counter, reset the monitoring timer, and resume waiting for monitoring messages. Processing of the monitoring messages may then resume as described herein, e.g., until the stop message is received.

FIG. 8 depicts an example ladder diagram depicting USB monitoring communications and operations in a second corrective action mode in accordance with some embodiments of the present disclosure. As depicted in FIG. 8, a merchant device 29 is coupled to a payment reader 22 over a USB cable. The communications depicted in FIG. 8 (i.e., messages 811, 812, 813, 814, 815, 816, 817, and 818) are communicated between merchant device 29 and payment reader 22 via the USB cable. The operations depicted in FIG. 8 are performed by merchant device 29 (e.g., operations 830, 831, 832, 833, 834, 835, 836, 837, 838, and 839 performed by processing unit 202 executing USB monitoring instructions 224, to operate USB interface 218) and payment reader 22 (e.g., operations 820, 821, 822, 823, 824, 825, and 826 performed by processing unit 120 of reader chip 100 executing USB monitoring instructions 134, to operate USB interface 110).

Initially, the processing of FIG. 8 may proceed in a similar manner to FIGS. 5-7, with merchant device 29 initiating the monitoring mode in response to a start trigger at operation 830, sending the initialization message 811, and at operation 831 starting the transmit timer and checking for messages from the payment reader 22. At operation 820, Payment reader 22 may begin the monitoring mode in response to receiving the initialization message 811 at operation 820, and may start the monitoring timer and wait for additional messages from the merchant device 29. Another monitoring message 812 may be sent at the expiration of the transmit timer, and at operation 832 merchant device 29 may reset the transmit timer and continue monitoring for messages from the payment reader.

As depicted in FIG. 8, monitoring message 812 may not be successfully received at payment reader 22 (e.g., as a result of electromagnetic interference such as noise 72 emitted by a noise source interfering with the message). At operation 821, the monitoring timer may expire and the payment reader 22 may initiate a response. As with the embodiment of FIGS. 6 and 7, in the first instance of a failure to receive the monitoring message before the expiration of the monitoring timer, the payment reader 22 may enter a reconnect mode in which a reconnect message 813 is sent by payment reader 22.

Once the reconnect message 813 is sent, payment reader 22 (at operation 821) may start the reconnect timer, increment a reconnect counter representing a number of missed monitoring messages, and resume waiting for messages from merchant device 29. As depicted in FIG. 8, the reconnect message 813 may be successfully received at merchant device 29. In an embodiment, at operation 833, merchant device 29 may increment a failed message counter and send another monitoring message 814. Although not depicted in FIG. 8, in another embodiment where the reconnect message is not received by merchant device 29, the merchant device 29 would nonetheless send another monitoring message 814 at the expiration of the transmit timer.

As depicted in FIG. 8, monitoring message 814 may not be successfully received at payment reader 22. At operation 821, the reconnect timer may expire and the payment reader 22 may initiate a response. In an embodiment, because this is the second consecutive failure to receive the monitoring message before the expiration of the monitoring timer (e.g., based on the value of the reconnect counter), the payment reader 22 may enter a first corrective action mode. As described herein, although the first corrective action mode may function in any suitable manner, in an embodiment reconnect messages may continue to be sent by the payment reader 22, and a first corrective action may be taken as described herein.

The payment reader 22 may send a second reconnect message 815 and commence operation 822 to engage in the first corrective action. In the embodiment of FIG. 8, the first corrective action may attempt to remedy the problem with USB communications without stopping payment processing or otherwise interrupting normal operation of the payment readers, e.g., by resetting USB interface 110, resetting a USB stack running on processing unit 120, or discharging the data lines of the USB interface. The reconnect counter may also be incremented. Once the first corrective action is completed, payment reader 22 may reset the reconnect timer and wait for messages from merchant device 29 at operation 823.

As depicted in FIG. 8, the reconnect message 815 may be successfully received at merchant device 29. In an embodiment, at operation 835, merchant device 29 may increment a failed message counter and send another monitoring message 816. Although not depicted in FIG. 8, in another embodiment where the reconnect message is not received by merchant device 29, the merchant device 29 would nonetheless send another monitoring message 816 at the expiration of the transmit timer.

Although in some embodiments, at operation 836 the merchant device 29 could take a corrective action (e.g., based on the value of the failed message timer), and similar to payment reader, could have multiple levels of corrective actions, in the embodiment of FIG. 8 the merchant device 29 may not take corrective action at operation 836. At operation 836, the merchant device 29 may increment the failed message counter, reset the transmit timer, and again wait for messages from payment reader 22.

As depicted in FIG. 8, monitoring message 816 may not be successfully received at payment reader 22. At operation 823, the monitoring timer may expire and the payment reader 22 may initiate a response. In an embodiment, because this is the third consecutive failure to receive the monitoring message before the expiration of the monitoring timer (e.g., based on the value of the reconnect counter), the payment reader 22 may enter a second corrective action mode. As described herein, although the second corrective action mode may function in any suitable manner, in an embodiment a final reconnect message 817 may be sent and the payment reader 22 may execute a second corrective action. In an embodiment, the final reconnect message may include an indicator that the payment reader is executing the second corrective action.

Although any suitable corrective action may be implemented as the second corrective action (e.g., resetting USB interface 110, resetting a USB stack running on processing unit 120, or discharging the data lines of the USB interface), in an embodiment the second corrective action may be a more severe corrective action, e.g., that may interrupt payment processing or other functionality of the payment reader. In an embodiment, at operation 824, the payment reader 22 may reset, i.e., stopping the processing of the payment reader and cycling power to the components thereof. In some embodiments, an indicator may be stored in non-volatile memory indicating that the second corrective action may take place. In an embodiment (not depicted in FIG. 8), the payment reader 22 could engage in additional communications and corrective action once the reset is complete based on the indicator of the second corrective action.

Once the second corrective action is complete, e.g., at operation 825, the payment reader 22 may return to normal operation outside of the monitoring mode. At operation 837, after receiving the third reconnect message 817, the merchant device 29 may initiate a merchant corrective action, such as resetting USB interface 218, resetting a USB stack running on processing unit 202, discharging the data lines of the USB interface 218, or resetting the entire merchant device 29. Once the merchant corrective action is complete, at operation 838, the merchant device may return to a normal operational mode in which it is not executing the monitoring mode. The monitoring mode may again be initialized as described herein, an initialization message 818 may be sent, and processing of the monitoring mode may continue as described herein at operations 839 and 826.

FIG. 9 depicts an example state diagram for payment reader 22 in accordance with some embodiments of the present disclosure. In an embodiment, the states (state 902, 904, and 906) and state transitions (state transition 901, 908, 910, 912, 914, 916, and 918) may be implemented by processing unit 120 of payment reader 22 executing instructions in memory 122 (e.g., USB monitoring instructions 134) to control circuitry of payment reader 22 (e.g., USB interface 110).

Processing may begin at state transition 901, at which the payment reader 22 may start, e.g., by powering up or exiting a sleep or low-power mode, and enter initial state 902. At initial state 902, payment reader 22 may be powered up and ready to receive messages via the USB interface 110. The payment reader may remain in initial state 902 until an initialization or monitoring message is received, at which point state transition 910 may transition into monitoring state 904.

After arriving at monitoring state 904 via state transition 910, the payment reader 22 may start the monitoring timer and wait for monitoring messages from merchant device 29. In some instances, processing may arrive at monitoring state 904 from monitoring mode 906 via state transition 916. If so, the payment reader may start the reconnect timer and wait for monitoring messages from merchant device 29. If a stop message is received, if the USB cable is disconnected from the USB interface 110, or if other conditions of the payment reader 22 cause the payment 22 to exit the monitoring program, state transition 908 may return the payment reader 22 to initial state 902. If a monitoring message is received by the payment reader 22 before the expiration of the monitoring timer or reconnect timer, state transition 912 may return the payment reader 22 to the monitoring state 904, at which the payment reader may reset the monitoring timer and wait for additional monitoring messages. In addition, if the monitoring message is received and state 904 is returned to via state transition 912, the reconnect counter may be reset (i.e., if one or more reconnect attempts were previously made at state 906, but a monitoring message is subsequently received at state 904, the reconnect counter may be reset).

If the monitoring timer expires before a monitoring message is received, state transition 914 may place the payment reader 22 in the reconnect 906. Although reconnect state 906 may operate in any suitable manner as described herein, in an embodiment, reconnect state 906 may take different actions based on a reconnect counter. If the reconnect counter is at zero (i.e., this is the first time the payment reader 22 failed to receive a monitoring message since the most recent initialization or monitoring message was received), the payment reader 22 may send a reconnect message, increment the reconnect counter, and via state transition 916 may return to the monitoring state 904.

In an embodiment, if the reconnect counter is at one after state transition 914 to reconnect state 906, the payment reader may take a first corrective action and again increment the reconnect counter. The first corrective action may attempt to remedy the problem with USB communications without stopping payment processing or otherwise interrupting normal operation of the payment readers, e.g., by resetting USB interface 110, resetting a USB stack running on processing unit 120, or discharging the data lines of the USB interface. Payment reader 22 may send another reconnect message to the merchant device, and then return to the monitoring state via state transition 916.

In an embodiment, if the reconnect counter is at two after state transition 914 to reconnect state 906, the payment reader may take a second corrective action and again increment the reconnect counter. In an embodiment, at operation 824, the payment reader 22 may reset, i.e., stopping the processing of the payment reader and cycling power to the components thereof. In some embodiments, the reconnect counter may be stored in non-volatile memory, such that the payment reader 22 may determine that the second corrective action was taken after reset. Once the second corrective action is taken, another reconnect message may be sent to the merchant device 29 and the payment reader 22 may return to initial state 902 via state transition 918.

FIG. 10 depicts an example state diagram for merchant device 29 in accordance with some embodiments of the present disclosure. In an embodiment, the states (state 1002, 1004, 1006, and 1008) and state transitions (state transition 1001, 1010, 1012, 1014, 1016, 1018, 1020, 1022, and 1024) may be implemented by processing unit 202 of merchant device 29 executing instructions in memory 204 (e.g., USB monitoring instructions 224) to control circuitry of merchant device 29 (e.g., USB interface 218).

Processing may begin at state transition 1001, at which the point-of-sale application running on the merchant device 29 may start, e.g., by a merchant selecting the point-of-sale application from a set of available applications on the merchant device 29. Once the point-of-sale application starts, the merchant device 29 may be in initial state 1002, in which it may remain until a start trigger for invoking the monitoring mode occurs, such as the powering up of the merchant device 29, opening (e.g., foregrounding) of the point-of-sale application, a merchant starting a transaction, a certain level of progress in the payment action (e.g., selecting item, finalizing items, etc.). Once the start trigger occurs, state transition 1012 may cause merchant device 29 to enter a messaging state 1004.

As is described herein, messaging state 1004 may be entered from initial state 1002 or from timer state 1008. From the initial state 1002, messaging state 1004 may be entered via state transition 1012 as a result of progress in the point-of-sale application (e.g., based on the start trigger). From the timer state, messaging state 1004 may be entered as a result of the transit timer expiring (state transition 1018) or a reconnect message being received before the timer expires (state transition 1020). Accordingly, at messaging state 1004 the payment reader may examine various operational parameters such as progress of the point of sale application and reconnect messages (e.g., determined by reference to failed message counter) to determine whether to send a monitoring message, exit the monitoring mode, or take corrective action.

In an embodiment, at messaging state 1004 the merchant device 29 may check the failed message counter and the status of the point-of-sale application. If the failed message counter is less than a threshold (e.g., three, as a result of receiving three reconnect messages) and if the point-of-sale has not encountered a stop trigger (e.g., ending a payment transaction, backgrounding the point-of-sale application, etc.), a monitoring message may be transmitted and the payment reader may transition to timer state 1008 via state transition 1020. If the failed message counter exceeds the threshold (e.g., indicating that three reconnect messages have been received by the merchant device), at state 1004 the merchant device may take the merchant corrective action such as resetting USB interface 218, resetting a USB stack running on processing unit 202, discharging the data lines of the USB interface 218, or resetting the entire merchant device 29. Once the merchant corrective action is taken, the merchant device may return to initial state 1002 via state transition 1010. If the status of the payment application indicates that the monitoring mode should be exited (e.g., as a result of stop trigger), the merchant device may transition to exit state 1006 via state transition 1014.

At timer state 1008, the merchant device 29 may monitor the USB interface 218 for reconnect messages from payment reader 22 and may monitor the transmit timer. If a reconnect message is received before the transmit timer expires, the failed message counter may be incremented and the merchant device 29 may return to messaging state 1004 via state transition 1020. If the transmit timer expires before a reconnect message is received, the failed message counter may be reset and the merchant device 29 may return to messaging state 1004 via state transition 1018. During timer state 1008, merchant device 29 may also determine whether a stop trigger has occurred. If a stop trigger has occurred merchant device 29 may transition to exit state 1006 via state transition 1022.

At exit state 1006, the merchant device may exit the monitoring mode. In an embodiment, the monitoring timer may be disabled, monitoring messages may no longer be sent, and the failed message counter may be reset. Once the monitoring mode has been successfully exited, merchant device 29 may return to initial state 1002 via state transition 1024.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for maintaining a Universal Serial Bus (USB) connection between a payment reader and a merchant device running a point-of-sale application, the method comprising:
    initializing communication over the USB connection between the merchant device and the payment reader;
    entering, at the merchant device, a monitoring mode based on an input to the point-of-sale application;
    sending a plurality of monitoring messages from the merchant device to the payment reader over the USB connection, wherein each monitoring message is sent at a first interval after a previous monitoring message while the merchant device is in the monitoring mode;
    receiving, at the payment reader, a first monitoring message of the plurality of monitoring messages;
    entering, at the payment reader, the monitoring mode in response to receiving the first monitoring message;
    starting, at the payment reader, a monitoring timer in response to receiving the first monitoring message, wherein the monitoring timer expires after a second interval;
    restarting, at the payment reader, the monitoring timer each time one of the monitoring messages is received at the payment reader;
    sending, from the payment reader to the merchant device over the USB connection, a reconnect message when the monitoring timer is expired;
    starting, at the payment reader, a first reconnect timer in response to sending the reconnect message, wherein the first reconnect timer expires if one of the monitoring messages is not received within a third interval;
    performing a first corrective action at a USB interface of the payment reader in response to the expiration of the first reconnect timer;
    starting, at the payment reader, a second reconnect timer after the expiration of the first reconnect timer, wherein the second reconnect timer expires if one of the monitoring messages is not received within a fourth interval; and
    performing a second corrective action at the USB interface of the payment reader in response to the expiration of the second reconnect timer.

2. The method of claim 1, wherein the first corrective action comprises resetting a USB stack associated with the USB interface.

3. The method of claim 1, wherein the first corrective action comprises resetting the USB interface.

4. The method of claim 1, wherein the second corrective action comprises resetting the payment reader.

5. A method for maintaining a Universal Serial Bus (USB) connection between a first device and a second device, the method comprising:
    receiving, via a USB interface of the first device, a first monitoring message of a plurality of monitoring messages;
    entering, at the first device, a monitoring mode in response to receiving the first monitoring message;
    starting, at the first device, a monitoring timer in response to entering the monitoring mode, wherein the monitoring timer expires after a transmit interval;
    restarting the monitoring timer each time one of the plurality of monitoring messages is received at the first device;
    starting, at the first device, a first reconnect timer when the monitoring timer is expired, wherein the first reconnect timer expires if one of the plurality of monitoring messages is not received within a second interval; and
    performing a first corrective action at the USB interface in response to the expiration of the first reconnect timer.

6. The method of claim 5, wherein the first corrective action comprises resetting a USB stack associated with the USB interface.

7. The method of claim 5, wherein the first corrective action comprises resetting the USB interface.

8. The method of claim 5, wherein the first corrective active comprises applying a corrective voltage to the USB interface.

9. The method of claim 8, wherein the corrective voltage comprises a ground voltage.

10. The method of claim 5, further comprising:
    starting, at the first device, a second reconnect timer after the expiration of the first reconnect timer, wherein the second reconnect timer expires if one of the plurality of monitoring messages is not received within a third interval; and
    performing a second corrective action at the USB interface in response to the expiration of the second reconnect timer.

11. The method of claim 10, wherein the second corrective action comprises resetting the first device.

12. The method of claim 5, further comprising sending the plurality of monitoring messages from the second device to the first device over the USB interface, wherein each monitoring message is sent at a first interval after a previous monitoring message while the second device is in the monitoring mode.

13. The method of claim 5, further comprising sending, from the first device to the second device via the USB interface, a reconnect message when the monitoring timer is expired.

14. A first device, comprising:
a Universal Serial Bus (USB) interface;
one or more processing elements coupled to the USB interface, wherein the one or more processing elements are configured to execute USB monitoring instructions; and
one or more memories configured to store the USB monitoring instructions, wherein the USB monitoring instructions cause the one or more processing elements to:
receive a first monitoring message of a plurality of monitoring messages via the USB interface,
enter a monitoring mode at the first device in response to receiving the first monitoring message, and
start a monitoring timer at the first device in response to entering the monitoring mode, wherein the monitoring timer expires after a first interval,
wherein the USB monitoring instructions further cause the one or more processing elements to:
restart the monitoring timer each time one of the plurality of monitoring messages is received at the first device,
start a first reconnect timer at the first device when the monitoring timer is expired, wherein the first reconnect timer expires if one of the plurality of monitoring messages is not received within a second interval, and
wherein the USB monitoring instructions further cause the one or more processing elements to perform a first corrective action at the USB interface of the first device in response to the expiration of the first reconnect timer.

15. The first device of claim 14, wherein the first corrective action comprises resetting a USB stack associated with the USB interface.

16. The first device of claim 14, wherein the first corrective action comprises resetting the USB interface.

17. The first device of claim 14, wherein the first corrective active comprises applying a corrective voltage to the USB interface.

18. The first device of claim 17, wherein the corrective voltage comprises a ground voltage.

19. The first device of claim 14, wherein the USB monitoring instructions further cause the one or more processing elements to:
start a second reconnect timer at the first device after the expiration of the first reconnect timer, wherein the second reconnect timer expires if one of the plurality of monitoring messages is not received within a third interval, and
wherein the USB monitoring instructions further cause the one or more processing elements to perform a second corrective action to the USB interface of the first device in response to the expiration of the second reconnect timer.

20. The first device of claim 19, wherein the second corrective action comprises resetting the first device.

21. The first device of claim 14, wherein the USB monitoring instructions further cause the one or more processing elements to receive the plurality of monitoring messages from a second device over the USB interface, wherein each monitoring message is received at a transmit interval after a previous monitoring message while the second device is in the monitoring mode.

22. The first device of claim 14, wherein the USB monitoring instructions further cause the one or more processing elements to send a reconnect message from the first device to a second device via the USB interface when the monitoring timer is expired.

23. A non-transitory computer-readable storage medium comprising instructions stored therein, which when executed by one or more processors, cause the one or more processors to perform operations comprising:
receiving, via a Universal Serial Bus (USB) interface, a first monitoring message of a plurality of monitoring messages;
entering a monitoring mode in response to receiving the first monitoring message;
starting a monitoring timer in response to entering the monitoring mode, wherein the monitoring timer expires after a first interval;
restarting the monitoring timer each time one of the plurality of monitoring messages is received;
starting a first reconnect timer when the monitoring timer is expired, wherein the first reconnect timer expires if one of the plurality of monitoring messages is not received within a second interval; and
performing a first corrective action at the USB interface in response to the expiration of the first reconnect timer.

24. The non-transitory computer-readable storage medium of claim 23, wherein the first corrective action comprises resetting a USB stack associated with the USB interface.

25. The non-transitory computer-readable storage medium of claim 23, wherein the first corrective action comprises resetting the USB interface.

26. The non-transitory computer-readable storage medium of claim 23, wherein the first corrective active comprises applying a corrective voltage to the USB interface.

27. The non-transitory computer-readable storage medium of claim 26, wherein the corrective voltage comprises a ground voltage.

28. The non-transitory computer-readable storage medium of claim 23, wherein the instructions further comprise instructions that cause the one or more processors to perform operations comprising:
starting a second reconnect timer after the expiration of the first reconnect timer, wherein the second reconnect timer expires if one of the plurality of monitoring messages is not received within a third interval; and
performing a second corrective action to the USB interface in response to the expiration of the second reconnect timer.

29. The non-transitory computer-readable storage medium of claim 28, wherein the second corrective action comprises resetting the one or more processors.

30. The non-transitory computer-readable storage medium of claim 23, wherein the instructions further comprise instructions that cause the one or more processors to perform operations comprising receiving the plurality of monitoring messages over the USB interface, wherein each monitoring message is sent at a transmit interval after a previous monitoring message.

31. The non-transitory computer-readable storage medium of claim 23, wherein the instructions further comprise instructions that cause the one or more processors to perform operations comprising providing, for transmission via the USB interface, a reconnect message when the monitoring timer is expired.

\* \* \* \* \*